United States Patent
Jochman

(10) Patent No.: US 11,203,968 B2
(45) Date of Patent: Dec. 21, 2021

(54) POWER SYSTEMS AND ENCLOSURES HAVING AN IMPROVED COMPRESSOR DRIVE

(71) Applicant: Illinois Tool Works Inc., Glenview, IL (US)

(72) Inventor: Nathan Joe Jochman, Menasha, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 15/498,072

(22) Filed: Apr. 26, 2017

(65) Prior Publication Data

US 2017/0314561 A1 Nov. 2, 2017

Related U.S. Application Data

(63) Continuation of application No. 15/480,955, filed on Apr. 6, 2017, now Pat. No. 10,371,039.
(Continued)

(51) Int. Cl.
*F02B 63/00* (2006.01)
*F01P 1/06* (2006.01)
(Continued)

(52) U.S. Cl.
CPC .................. *F01P 1/06* (2013.01); *B23K 9/32* (2013.01); *F01N 13/007* (2013.01); *F01P 1/02* (2013.01);
(Continued)

(58) Field of Classification Search
CPC ........ B23K 9/32; B23K 9/232; B23K 9/1006; F01P 1/02; F01P 1/06; F02B 63/00; F02B 63/04; F02B 63/044; F02B 63/048
(Continued)

(56) References Cited

U.S. PATENT DOCUMENTS 3,943,374 A * 3/1976 Clements ................ F01D 5/026
290/52
4,293,281 A * 10/1981 Lamoreaux ............. F04B 35/06
417/319
(Continued)

FOREIGN PATENT DOCUMENTS

DE 3121822 12/1982
FR 2877782 5/2006

OTHER PUBLICATIONS

PCT Notification of Transmittal of the International Search Report and the Written Opinion of the International Searching Authority, or the Declaration, dated Jun. 30, 2017, 14 pages.

*Primary Examiner* — Robert J Utama
*Assistant Examiner* — Ayub A Maye
(74) *Attorney, Agent, or Firm* — McAndrews, Held & Malloy, Ltd.

(57) ABSTRACT

Systems are disclosed for power systems and enclosures having an improved compressor drive. In examples, a power system includes a generator to be driven by an engine. The generator is coupled to the engine on a first side of the generator and has a clutch extending from a second side of the generator opposite the engine. The clutch is coupled to the engine. A compressor is positioned at the second side of the generator opposite from the engine. The compressor comprising a shaft extending toward the generator and configured to be driven by the clutch.

20 Claims, 5 Drawing Sheets

Related U.S. Application Data

(60) Provisional application No. 62/329,727, filed on Apr. 29, 2016.

(51) Int. Cl.

| | | |
|---|---|---|
| *F01P 1/02* | (2006.01) | |
| *F02B 67/06* | (2006.01) | |
| *F02B 63/04* | (2006.01) | |
| *B23K 9/32* | (2006.01) | |
| *F04C 18/16* | (2006.01) | |
| *F04C 29/00* | (2006.01) | |
| *H02K 7/10* | (2006.01) | |
| *H02K 7/108* | (2006.01) | |
| *H02K 7/18* | (2006.01) | |
| *F01N 13/00* | (2010.01) | |
| *F02B 63/06* | (2006.01) | |
| *F02M 35/10* | (2006.01) | |
| *B23K 9/10* | (2006.01) | |

(52) U.S. Cl.
CPC ............ *F02B 63/04* (2013.01); *F02B 63/044* (2013.01); *F02B 63/06* (2013.01); *F02B 67/06* (2013.01); *F02M 35/10268* (2013.01); *F04C 18/16* (2013.01); *F04C 29/005* (2013.01); *H02K 7/1004* (2013.01); *H02K 7/108* (2013.01); *H02K 7/1815* (2013.01); *B23K 9/1006* (2013.01); *F04C 2240/60* (2013.01)

(58) Field of Classification Search
USPC .................................................. 219/133, 134
See application file for complete search history.

(56) References Cited

U.S. PATENT DOCUMENTS

| | | | |
|---|---|---|---|
| 5,518,262 A * | 5/1996 | Hutchinson | B60D 1/167 280/475 |
| 6,053,563 A * | 4/2000 | Edgeller | B62D 25/105 248/671 |
| 6,674,046 B2 * | 1/2004 | Bankstahl | B23K 9/1006 219/133 |
| 6,796,367 B2 * | 9/2004 | Blacquiere | B60H 1/3222 165/41 |
| 6,989,509 B2 * | 1/2006 | Silvestro | B23K 9/1006 219/133 |
| 7,105,774 B2 * | 9/2006 | Bender | B23K 9/1006 219/133 |
| 7,552,708 B2 * | 6/2009 | Serkh | F01L 1/024 123/198 R |
| 2002/0039942 A1 | 4/2002 | Liu et al. | |
| 2002/0122727 A1 * | 9/2002 | Gaither | F04B 17/05 417/16 |
| 2003/0235505 A1 * | 12/2003 | Brunelli | F04B 35/002 417/234 |
| 2007/0132243 A1 * | 6/2007 | Wurtele | F01N 13/08 290/1 A |
| 2008/0023965 A1 * | 1/2008 | Cagliari | H02K 7/1815 290/1 B |
| 2008/0286128 A1 | 11/2008 | Chang | |
| 2009/0160573 A1 * | 6/2009 | Salsich | B23K 10/006 333/25 |
| 2009/0263259 A1 * | 10/2009 | Picton | H02K 7/1815 417/364 |
| 2010/0199950 A1 * | 8/2010 | Renner | B66C 23/42 123/347 |
| 2011/0309053 A1 * | 12/2011 | Baus | B23K 9/095 219/108 |
| 2011/0309055 A1 | 12/2011 | Rozmarynowski et al. | |
| 2013/0247573 A1 | 9/2013 | Kennedy | |
| 2013/0274043 A1 * | 10/2013 | Hartmann | F02B 67/06 474/87 |
| 2013/0288835 A1 * | 10/2013 | Hauck | F02B 67/06 474/87 |
| 2013/0296086 A1 * | 11/2013 | Hauck | F02N 15/08 474/87 |
| 2014/0231400 A1 * | 8/2014 | Bankstahl | F02B 63/04 219/133 |

* cited by examiner

POWER SYSTEMS AND ENCLOSURES HAVING AN IMPROVED COMPRESSOR DRIVE

RELATED APPLICATIONS

This patent claims priority to U.S. Provisional Patent Application No. 62/329,727, filed Apr. 29, 2016, entitled "Power Systems and Enclosures Having Improved Cooling Air Flow" and U.S. patent application Ser. No. 15/480,955, filed Apr. 6, 2017, entitled "Power Systems and Enclosures Having Improved Cooling Air Flow." The entirety of U.S. Provisional Patent Application No. 62/329,727 and U.S. patent application Ser. No. 15/480,955 are incorporated herein by reference.

BACKGROUND

Conventionally, engine-driven power systems (e.g., generators/air compressors/welders) are contained within a metal enclosure that provides environmental protection for the equipment and provides a safety, sound, and aesthetic barrier for the operators. Many different types of enclosures have been used for conventional power systems. Conventional enclosures are configured with components in such a way as to house the engine and/or generator components based on their relative locations.

SUMMARY

Power systems and enclosures having an improved compressor drive are disclosed, substantially as illustrated by and described in connection with at least one of the figures.

BRIEF DESCRIPTION OF THE DRAWINGS

The figures are not necessarily to scale. Where appropriate, similar or identical reference numbers are used to refer to similar or identical components.

DETAILED DESCRIPTION

Figure 1:
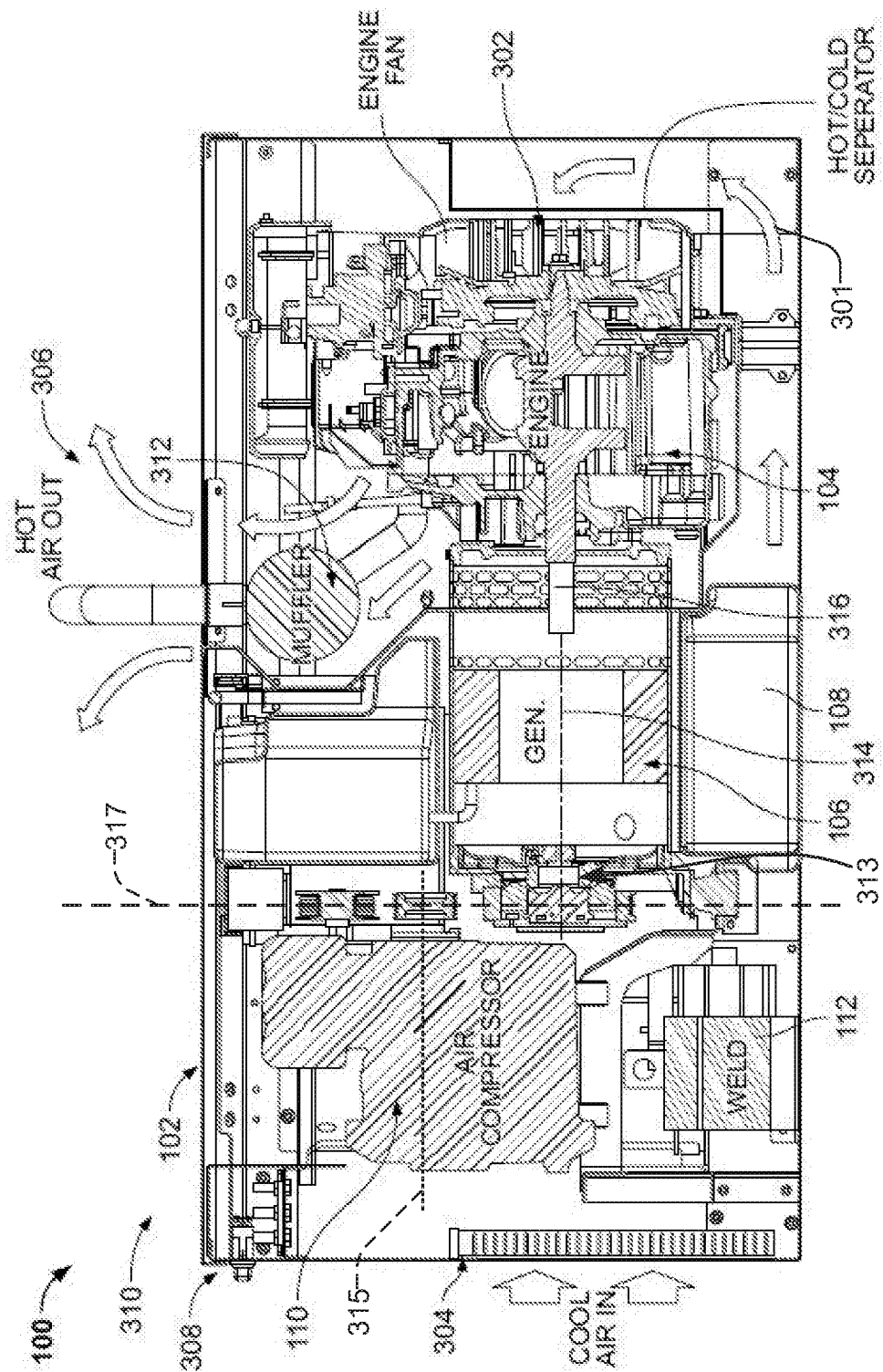
FIG. 1 is a side view of an example power system, in accordance with aspects of this disclosure.

Conventionally, engine driven generators and compressors systems include access panels that are located on multiple sides of the equipment to provide access to all of the needed service points. Examples of engine-driven products that have enclosures are home-standby generators, portable generators and/or welders, and portable air compressors. The enclosure is often well suited for the use of the equipment and has multiple access panels (e.g., doors) to access the various components contained therein, and/or air inlet and exit openings (e.g., louvers/holes).

This disclosure relates to configurations and mechanical connections of a compressor (e.g., an air compressor) in an engine-generator enclosure. Specifically, this disclosure provides examples that place the compressor relative to the generator in such a way that the design of the compressor drive system is simplified, has greater reliability over conventional designs, allows for a more compact machine (and therefore, a more compact enclosure), and is readily serviced while mounted in a vehicle mount installation.

In disclosed examples, engine driven generators, air compressors and welders can be encased within a metal enclosure which provides environmental protection for the equipment and provides a safety, sound, and aesthetic barrier for the operators. The size and serviceability (e.g., of the belt, oil check/change, filter replacement, etc.) of the system, how compact the unit is, relative ease of assembling the system, as well as costs and durability, are directly related to the configuration of enclosed components and in how they interact.

Within the enclosure, the engine is the source of mechanical power, with the generator and compressor utilizing that power to provide output, in the form of electrical power and compressed air, respectively, in conventional systems. The mechanical power of the engine is transferred to the generator and compressor via a rotatable belt. The particular configuration of the belt, as to how the generator transfers power to the compressor, has important implications in determining the reliability of the system.

In disclosed examples, the air compressor is driven by the end of an armature shaft via a belt and pulley system. The armature shaft is directly connected to the engine crankshaft, such that the crankshaft and armature shaft are on the same axis and operate as one shaft. Conventional multi-output engine-driven power systems (e.g., power systems that include a generator, compressor, welder, and/or battery chargers) have a generator that is parallel to the engine and driven by a belt. By directly connecting the generator to the engine (e.g., and not connecting the compressor to the engine), disclosed examples reduce the number of moving parts (e.g., only the compressor is belt-driven instead of both the generator and the compressor being belt-driven), which results in greater reliability and a more physically compact system. The direct connection of the generator to the engine places the components with the axis of rotation along the length of the enclosure, which puts the side of the engine and the compressor facing the side of the enclosure that permits easy service access (e.g., the same side of the enclosure). Disclosed examples offset the centerlines of the armature shaft of the generator and the compressor, to enable installation of a belt to connect the generator and the compressor. The offset is achieved in disclosed examples by raising a height of the compressor above the generator.

Conventional systems place the engine, generator and compressor side-by-side, such that a horizontal gasoline engine crankshaft is arranged as parallel to the generator armature shaft and the compressor shaft, both of which are driven by a belt linked to the engine. This arrangement allows for each of the three shafts to rotate in the same direction, with a multiple belt system used to connect each shaft. However, this configuration creates a complex belt system that reduces accessibility to service points on the engine and/or the compressor. The difficulty arises due to the service sides of the engine and compressor facing internally to the machine and thereby blocking the service access to the engine and compressor.

Some conventional systems directly couple the engine to the generator and rigidly mount the compressor to the top of the generator. In this configuration, a belt can be used to connect the generator armature shaft to the compressor input shaft, which reduces the complexity of the belting by rigidly connecting the engine, compressor, and generator in a way that maintains similar shaft rotations. The difficulty with this approach is that the compressor being mounted on top of the generator increases a dimension of the enclosure (e.g., the height), making the enclosure difficult to transport and mount. Moreover, the compressor being rigidly mounted to the engine and generator does not allow for vibrational isolation from the engine which consequently is supporting the weight of all of the components.

Some example conventional systems utilize a small inline diesel engine, which has service access points on the same side as the compressor. If the diesel engine were replaced with a gasoline engine in the described configuration, however, the service access would be on the opposite side of the compressor. Such a configuration would require multiple service access points for the internal components.

The presently disclosed systems improve upon the above-mentioned conventional systems by allowing the engine and generator to be rigidly coupled. This configuration results in a compact, cost effective, and reliable system, with the compressor to be driven by the generator by a simple belting path from the generator armature shaft while providing the benefits of same-side servicing (e.g., on a single side of the enclosure). In an example system employing a horizontal shaft air cooled gasoline engine, the resulting system that includes a compressor, welding components and a coupled engine-generator is contained in an efficient package, providing a smaller overall machine size.

In accordance with the disclosed examples, example system configurations for packaging an air compressor with an engine-driven generator achieve a simpler, more cost effective, more reliable, and more compact product that allows the engine and compressor to be serviced from a same side of the enclosure.

Disclosed examples provide same side service access for the components of the power systems. For example, a compressor and an engine require service access for oil level check, oil replacement, filter replacement, and/or any other maintenance tasks. Disclosed examples include enclosures in which the service access points are all located on one side and/or through one or more movable top covers of the enclosure. The same side and/or top cover access allows the other sides of the unit to be placed with substantially zero clearance up against walls of an installation site (e.g., a work truck body and/or other objects).

In disclosed examples, one or more components (e.g., an engine, a generator, a compressor, a power conversion unit, etc.) are mounted on brackets within the enclosure to provide stability, service access, and allow air to flow underneath the components. In conventional power systems, the air compressor is located next to and/or below the engine to enable connection between the compressor shaft and the engine shaft via a belt.

In disclosed examples, an air compressor is elevated substantially above the generator centerline to enable the weld components to be located underneath the compressor, which allows weld components and/or the compressor to fit in a smaller enclosure size. Disclosed examples also reduce the difficulty of servicing the air compressor, relative to conventional power systems, because the higher location in the enclosure positions the service points closer to top cover openings and/or side door openings that are generally more accessible to maintenance personnel.

In disclosed examples, a power system includes a generator configured to be driven by an engine, the generator coupled to the engine on a first side of the generator and having a generator clutch extending from a second side of the generator opposite the engine, the generator clutch being coupled to the engine. The clutch is coupled to the engine via the generator armature shaft. A compressor positioned at the second side of the generator opposite from the engine, the compressor including a compressor shaft extending toward the generator and configured to be driven by the generator clutch. The power system includes a belt configured to operatively link the generator clutch and a compressor pulley coupled to the compressor shaft.

The power system also includes an idler pulley and a tensioner, wherein the belt links the generator clutch, the compressor pulley, the idler pulley and the tensioner. In some examples, the generator clutch is configured to drive the belt, such that the idler pulley and the tensioner are driven in a first rotational direction and the compressor pulley is driven in a second rotational direction opposite the first rotational direction. In examples, the belt is driven in a tortuous path around the generator clutch, the compressor pulley, the idler pulley and the tensioner.

In some examples, a first span of the belt linking the generator clutch to at least one of the idler pulley or the tensioner has a length that is greater than a possible second span that would directly link the generator clutch and the compressor pulley. In examples, the belt is a two-sided drive belt.

In disclosed examples, the power system includes an enclosure, wherein the enclosure is configured to provide service access to the generator, the engine, the belt and the compressor housed in the enclosure. The service access can be located on a same side of the enclosure. The service access can be located on at least one of a top side and a lateral side of the enclosure. In examples, the power system includes power conversion circuitry located in a compartment below the compressor within the enclosure.

In some examples, a crankshaft of the engine is directly coupled to an armature shaft of the generator to turn the generator clutch. In disclosed examples, the engine and generator are configured to rotate in a given direction, and the compressor shaft is configured to rotate in a direction opposite the given direction. In an example, the engine is a horizontal shaft air-cooled gasoline engine.

In disclosed examples, a power system provides welding-type power having an enclosure that includes a generator configured to be driven by an engine and contained in the enclosure, the generator coupled to the engine on a first side of the generator and having a clutch extending from a second side of the generator opposite the engine, the clutch being coupled to the engine. A compressor positioned at the second side of the generator opposite from the engine, the compressor having a compressor shaft extending toward the generator and configured to be driven by the clutch, and power conversion circuitry operatively connected to the generator.

In some examples, the enclosure is configured to provide service access to the generator, the engine, the belt and the compressor on a same side of the enclosure. In examples, a crankshaft of the engine is directly coupled to an armature shaft of the generator to drive the clutch. In some examples, the generator is configured to drive the compressor shaft by a belt linking the generator clutch and a compressor pulley coupled to the compressor shaft.

In disclosed examples, power conversion circuitry is configured to provide welding-type power for a welding-type tool. For example, the welding-type tool is one of a welding-type torch, a plasma cutter, a wire feeder, and an induction heating device.

As used herein, power conversion circuitry refers to circuitry and/or electrical components that convert electrical power from one or more first forms (e.g., power output by a generator) to one or more second forms having any combination of voltage, current, frequency, and/or response characteristics. The power conversion circuitry may include safety circuitry, output selection circuitry, measurement and/or control circuitry, and/or any other circuits to provide appropriate features.

As used herein, the terms "first" and "second" may be used to enumerate different components or elements of the same type, and do not necessarily imply any particular order. For example, while in some examples a first compartment is located prior to a second compartment in an airflow path, the terms "first compartment" and "second compartment" do not imply any specific order in which air flows through the compartments.

FIG. 1 is a side view of the example power system 100. The example power system 100 of FIG. 1 is an engine-driven power system. The system 100 includes an engine 104 that drives a generator 106 to generate electrical power. The engine 104 receives fuel from a fuel tank 108. The generator 106 provides the electrical power to power conversion circuitry 112 and/or an air compressor 110. The power conversion circuitry 112 provides one or more types of electrical power suitable for specific and/or general purpose uses, such as welding-type power, 110 VAC and/or 220 VAC power, battery charging power, and/or any other type of electrical power. The example system 100 may include other components not specifically discussed herein. The components 104-112 are arranged within the enclosure 102 as described herein.

The power system 100, the enclosure 102, and the components 104-112 feature an improved construction and configuration that simplifies the machine design. As described in detail below, the system is configured to operate in, and be serviced in, truck mounted installations. Improved airflow paths are also provided.

The configuration employs a generator 106 that is rigidly connected to an engine 104. The end of the generator 106 that is opposite the engine 104 has a clutch attached for transmission of power from the engine 104, via the generator armature shaft 313, to a compressor 110. The engine 104 and generator 106 are vibration isolated from the base structure of the enclosure 102. The compressor 110 (e.g., a rotary screw compressor) is rigidly mounted to the base (i.e. it does not vibrate when operating). The input shaft side of the compressor 110 is facing the clutch of the generator 106 such that a pulley installed on the compressor input shaft is substantially aligned with the clutch (see, e.g., FIG. 2). This configuration enables a belt to transfer power from the clutch to the compressor pulley (see, e.g., FIG. 3). In this way, the compressor 110 and the shaft extending therefrom is opposing (i.e. facing) the end of the generator 106 from which the clutch extends. In the example of FIG. 1, a belting system is employed to link the clutch from the generator 106 to the shaft of the air compressor 110 in a plane 317 situated between the two.

This unique placement of components allows the compressor 110 to be lower than conventional designs which enables a reduction in enclosure height. The opposing compressor 110 also places the compressor service access on the same side as that for a gasoline powered small engine. This is advantageous for power systems designed for vehicle mounting (e.g., on service trucks) because the systems can be mounted to provide access on a same service side.

However, arranging the compressor 110 to oppose the clutch end of the generator 106 creates at least two problems: 1) the rotation of the compressor shaft is now opposite the clutch rotation; and 2) a centerline 315 of the compressor shaft is relatively close to a centerline 314 of the clutch. In a belted system, pulleys that are located closely together make it difficult to route a belt from one pulley to the other. Further, allowable misalignment of the moving belt is minimized because of the short belt span from one pulley to the other, and designing a tensioner system to maintain proper belt tension with a very short belt span, is difficult. The reliability of a system like this is poor because the compressor pulley is fixed and the generator clutch is isolated (e.g., the clutch, the engine and/or the generator can move on rubber mounts during operation). Any relative motion between pulleys (e.g., between the generator 106 clutch and the compressor 110 shaft) can cause the belt to wear or jump off the pulley.

As illustrated in FIG. 1, the air compressor 110 is substantially elevated above centerline 314 (e.g., the armature shaft 313) of the generator 106. By having elevated a compressor 110, the power conversion circuitry 112 can be located underneath the compressor 110 and allows power conversion circuitry 112 and/or the compressor 110 to fit in a smaller enclosure 102.

The air compressor 110 is driven by the end of an armature shaft 313 directly connected to a crankshaft 316 of the engine 104, such that the crankshaft 316 and the armature shaft 313 are on the same axis and operate as one shaft. By directly connecting the generator 106 to the engine 104 while not connecting the compressor 110 to the engine 104, the example power system 100 has a reduced number of moving parts as only the compressor 110 is belt-driven, instead of both the generator 106 and the compressor 110 being belt-driven. Reducing the number of moving parts results in greater reliability and a more physically compact system.

The example configuration of internal components allows the system 100 to be installed into truck and/or other tight applications with zero clearance on more than one side. The placement of the compressor 110 above the generator 106 also reduces the difficulty of servicing the compressor 110, relative to conventional power systems, because the higher location in the enclosure positions the service points closer to top cover openings and/or side door openings that are generally easier to access for maintenance personnel.

Additionally, the example of FIG. 1 illustrates an advantageous air routing path 301 that uses an engine fan 302 as the only fan pulling air in through an air inlet location 304 and pushing air out through an air exhaust location 306. The air inlet location 304 is on a first side 308 of the enclosure 102 and the air exhaust location 306 is at a top 310 of the enclosure 102 adjacent a muffler 312. The enclosure 102 has an improved cooling air flow by having the single air inlet location 304 for all of the cooling air located at one end of the enclosure, and the one air exhaust location 306 for all exiting hot air at the top of the enclosure 102. In some examples, other inlet and/or exhaust locations may be included on the enclosure 102. This is due to thermal alignment of the components 104-112 in the enclosure 102.

Figure 2:
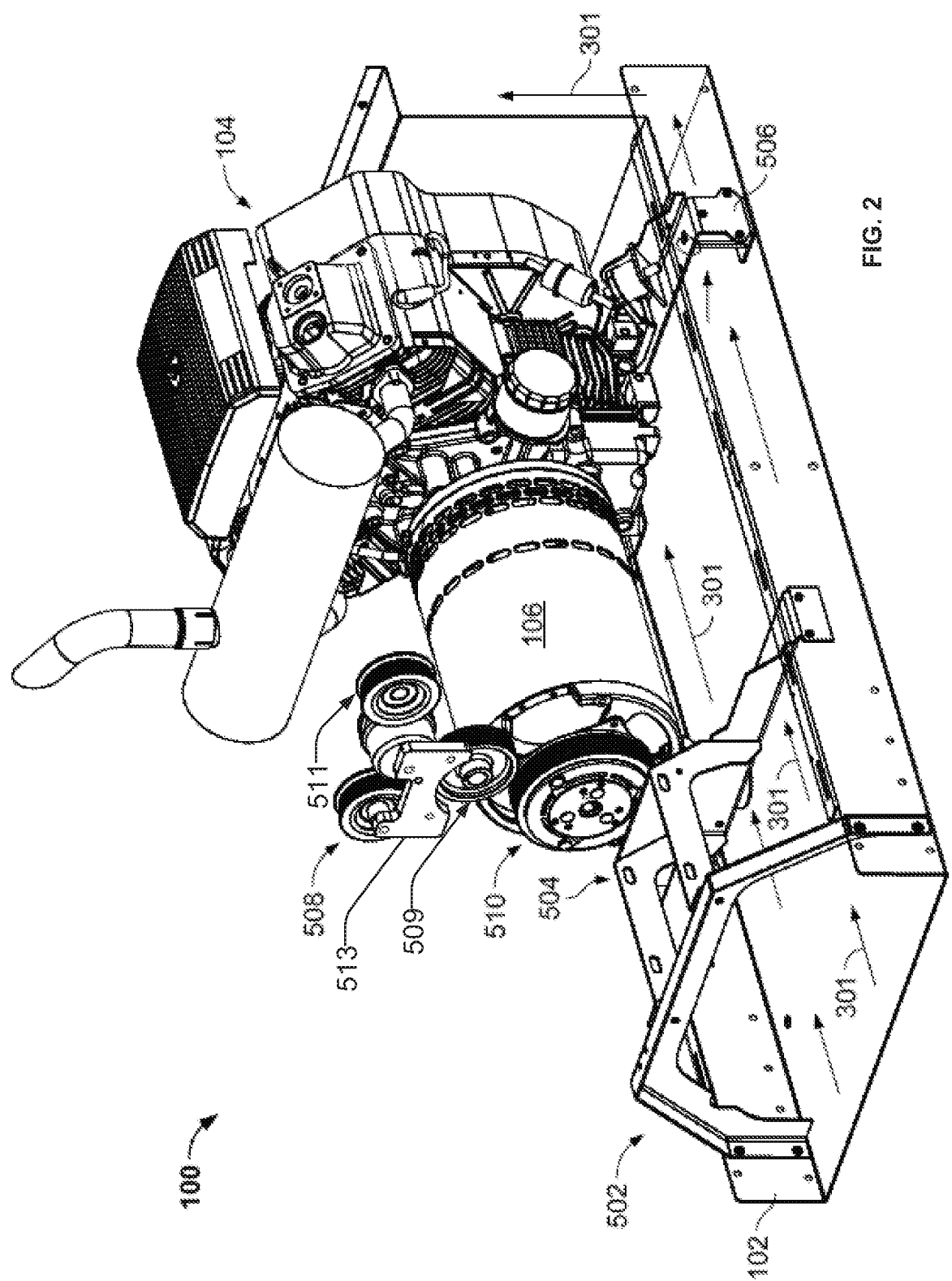
FIG. 2 is a perspective view of selected components of the power system of FIG. 1, showing brackets in a base and showing a compressor pulley, idler and tensioner pulleys and a generator clutch.

FIG. 2 is a perspective view of selected components of the power system of FIG. 1, showing brackets 502, 504, 506 in a base and showing a compressor pulley 509 coupled to a compressor shaft, the compressor pulley 509 to be driven from a generator clutch 510 of a generator 106. As shown in FIG. 2, the compressor pulley 509 is offset from the generator clutch 510. Also shown is an idler pulley 508 and a tensioner 511 mounted on bracket 513, which provides structure for the idler pulley 508 and the tensioner 511, with the tensioner providing flexibility for the belt (see, e.g., FIG. 3). FIG. 2 also illustrates t air routing path 301 flowing beneath the brackets 502, 504, 506 from the air inlet location 304 and underneath the engine 104 to an opposite side of the enclosure 102 from the air inlet location 304. The system disclosed herein solves both the opposite rotation issue and the centerline proximity issue by a unique configuration of the belting system to link the generator clutch 510, the compressor pulley 509, an idler pulley 508, and a tensioner 511, as illustrated in FIG. 2.

Figure 3:
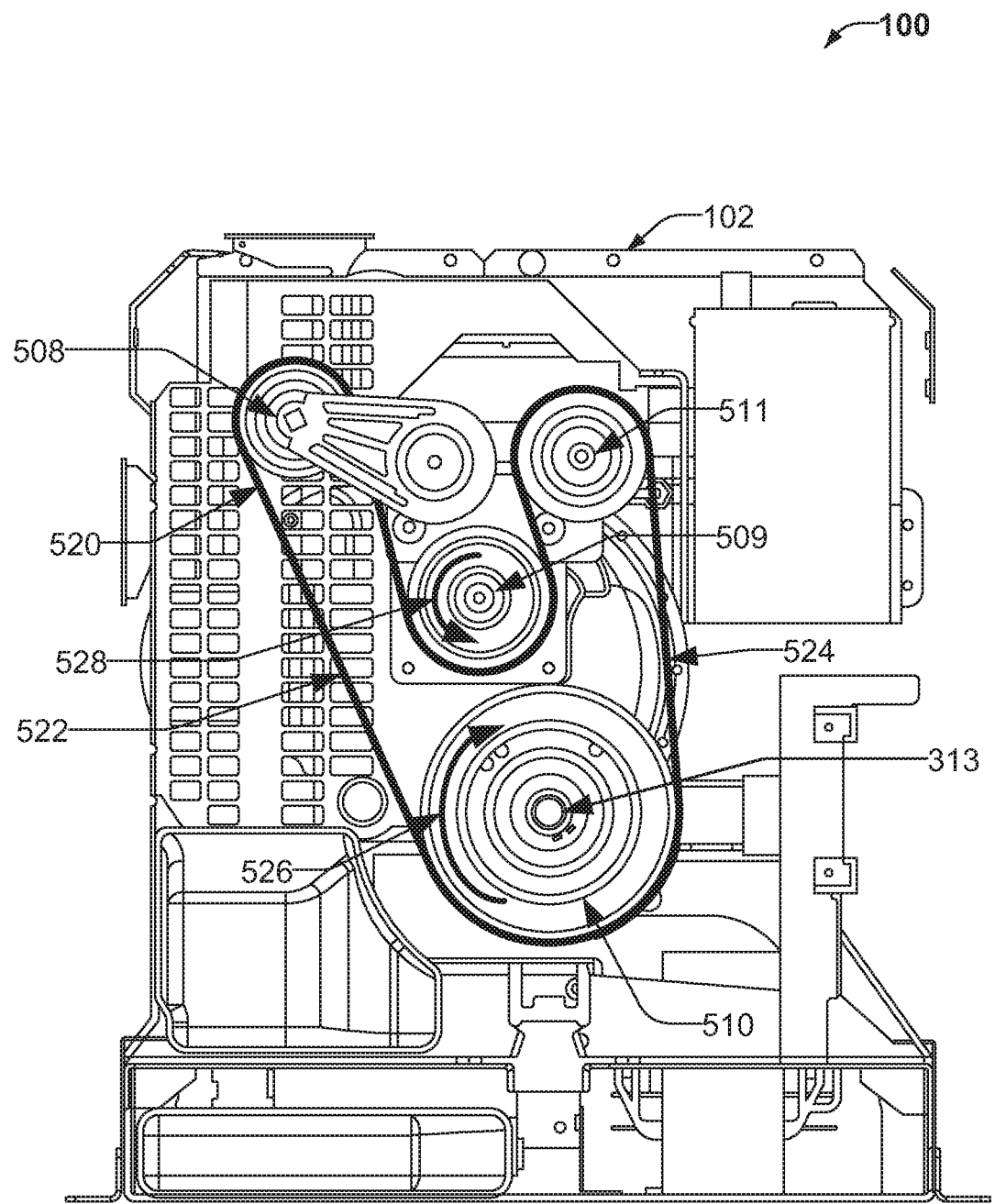
FIG. 3 is a side view of the power system of FIG. 1, showing a belting system linking the compressor pulley and the generator clutch.

FIG. 3 shows a belting system that links the compressor pulley 509 to the generator clutch 510 via a generally tortuous (e.g., "heart-shaped") pathway. As shown in FIG. 3, employing a two-sided belt 520 allows the compressor pulley 509 to be driven by the opposite side of the belt 520 than the clutch 510. In this way, the rotation of the compressor pulley 509, illustrated as arrow 526, is in reverse relative to the rotational direction of the armature shaft 313 of the generator 106, illustrated as arrow 528. Thus, the unique configuration of the compressor 110 facing the generator 106 allows drive and driven to be opposite one another, thus maintaining a small enclosure as well as operably linked.

The problems described above relating to close centerlines of the drive (e.g., the clutch 510) and driven (e.g., the compressor pulley 509) are alleviated by placing the idler 511 and tensioner 508 pulleys at a distance from the clutch 510 sufficient to create a longer belt span from the isolated clutch 510 and the fixed pulleys 508, 511. In particular, a belt span is defined as the length of belt between a point at which the belt makes contact with a first pulley and a point at which the belt makes contact with a second pulley. As described above, the centerlines of the clutch 510 and the compressor pulley 509 (corresponding to centerlines 314 and 317, respectively) are located a short distance from each other. Although it is possible to link the clutch 510 and the compressor pulley 509 directly, belting the clutch 510 and the compressor pulley 509 at such a short distance would introduce challenges in servicing the belt, as well as misalignment and wear issues due to the use of a shorter belt.

The longer belt span allows for misalignment or movement of the clutch 510 with no adverse effects to the belt 520. This is because for a given displacement of the clutch 510, the longer the span of belt 520, the smaller the angle of misalignment (see, e.g., FIG. 3). In the example if FIG. 3, the belting spans 522 and 524 are substantially longer than the longest possible span that would result from directly routing the belt 520 between the clutch 510 and the compressor pulley 509. As discussed below, the longer belting span(s) improve the belting system over directly linking the clutch 510 and the compressor pulley 509.

As shown in the example of FIG. 3, the belting path is substantially expanded, such that a first span 522 of the belt is supported by a pulley 508. The belt 520 then continues around the compressor pulley 509, and around the pulley 511. As shown, this path allows the two-sided belt 520 to drive the compressor pulley 509 in the second rotational direction 528, to accommodate the position of the compressor 110 relative to the generator 106. The second span 524 of the belt along the belting path, from pulley 511 to generator clutch 510, is also substantially longer than the direct distance between the centerlines of the clutch 510 and the compressor pulley 509, as well as contact points between the belting path between the clutch 510 and the compressor pulley 509. Thus, the drive can be a certain distance from the driven in the belting path, with the desired span length between the drive and a pulley being dependent on a predetermined misalignment and operational displacement tolerance (e.g., of the belt, the drive, the pulley system, etc.).

The disclosed system also provides for the compressor pulley 509, idler pulley 511, and tensioner pulley 508 to be at fixed positions relative to each other when the system is fully assembled. The pulleys are easy to line up with the clutch pulley because the compressor and pulley assembly slides axially in the compressor mounting bracket (e.g., by use of slotted mounting holes, not shown). This prevents the need for axial adjustment of the pulleys on fixed shafts. This also improves assembly and field serviceability of the belt 520 since the compressor can slide away from the generator to increase service access space for belt removal and installation. The compressor 106 can be slid easily back and forth to line up each of the pulleys to improve belt function.

Figure 4:
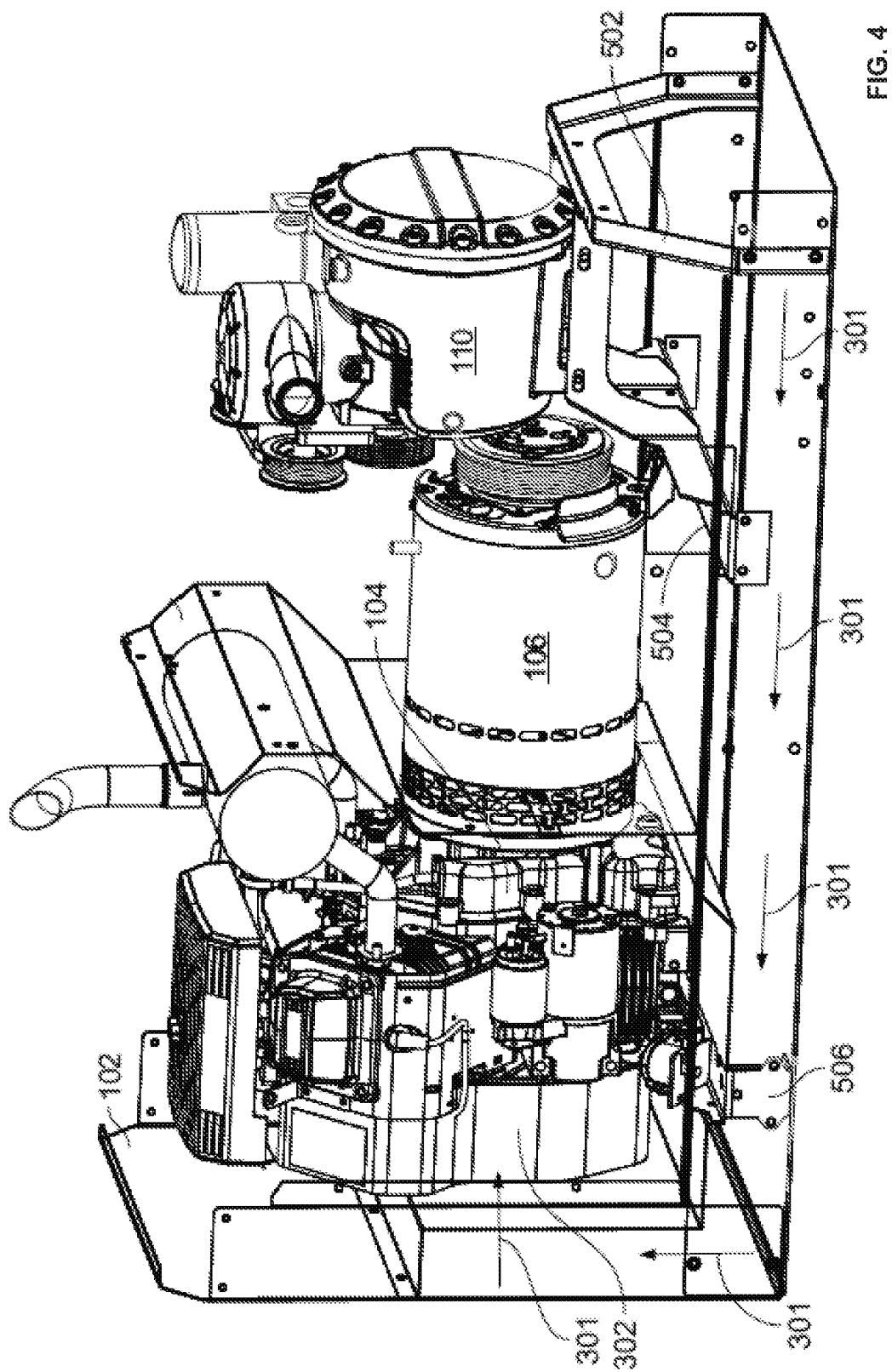
FIG. 4 is another perspective view of selected components of the power system of FIG. 1.

FIG. 4 is another perspective view of selected components of the power system 100 of FIG. 1, showing the brackets 502, 504, 506 in the base that support the components 104-112 and provide the unique configuration as described herein. Airflow path 301 is shown flowing through the enclosure, represented by arrows.

Disclosed examples place components and include an enclosure enabling installation of a power system tightly against adjacent walls (e.g., having no clearance or access) on more than one side. Additionally or alternatively, disclosed examples permit service access for the compressor and engine through one side of the unit and through the top of the unit, as may be desirable in a truck mounted installation. Disclosed examples provide an airflow path within the enclosure that is novel, achieves standard mounting of the generator to the engine, and drives the compressor from the generator shaft while maintaining a primary airflow cooling path through the enclosure.

The thermal alignment of the airflow circuit allows the engine fan to cool more than just the engine. Specifically, the air compressor cooler is cooled by air pulled into the engine by the engine fan. The use of the engine fan to move the air enables the use of only one inlet location and one outlet location, which is beneficial for truck mounted installations. The use of the engine fan improves the efficiency of use of the cooling air and/or reduces the number and/or size of cooling fans.

Figure 5:
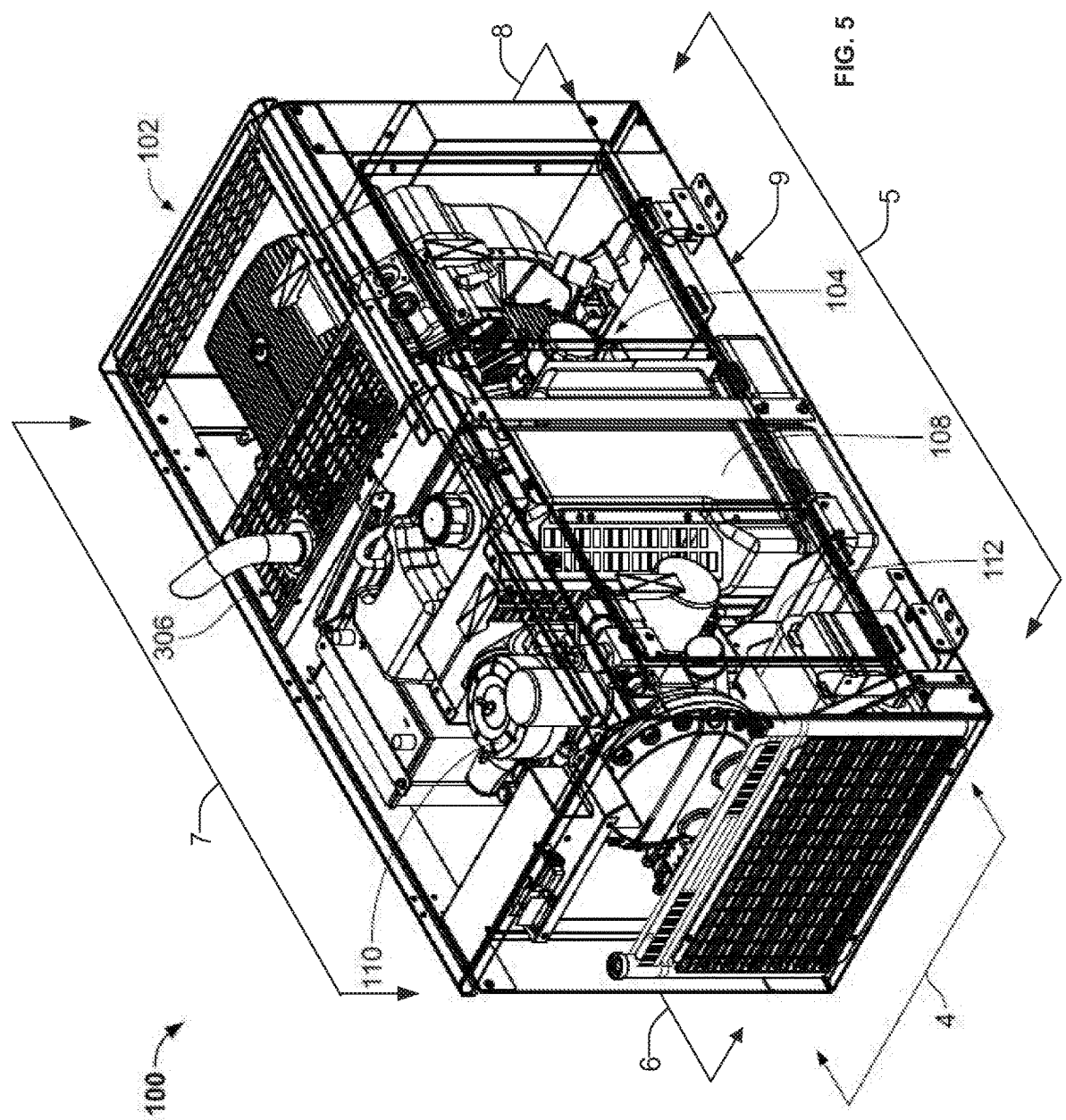
FIG. 5 is a perspective view of an example power system arranged within an enclosure with selected panels of the enclosure removed.

FIG. 5 is a perspective view of an example power system 100 arranged within an enclosure 102. The enclosure 102 is primarily constructed with sheet metal, and may include one panel or multiple panels. One or more of the panels may be removable and/or one or more of the panels may open to permit access. As shown in the example of FIG. 5, the enclosure can have six or more side surfaces. Front surface 4 can include a panel having an air inlet (e.g., air inlet location 304 of FIG. 1), a first lateral side 5, a second lateral side 6, a top side 7, a rear side 8, and a bottom side 9. Relative terms (e.g., front/rear, etc.) are used to aid in the reader's understanding of the enclosure's configuration. Although relative terms are used to describe the various surfaces and sides of the enclosure 102, any side can be considered a top/bottom/front/rear/first side/second side, depending on a particular design of the power system 100, the installation configuration, and/or perspective of the viewer.

In the example of FIG. 5, one or more sides of the enclosure 102 can be configured to provide service access. Service access can be provided by a removable panel (e.g., by fasteners), a door (e.g., via a hinged panel), a void in the enclosure, or by any other suitable method or design. In some examples, the first side 5 can provide access to each of the serviceable components (e.g., the engine 104, the generator 106, the compressor 110, the belt 520, etc.) of the system 100, as described with respect to FIGS. 1-4. In an example employing paneling, which would be removed as shown, can span the entire length of the enclosure 102. In other examples, a first panel can provide access to the compartment containing the compressor 110, and a second panel can provide access to the engine 104. More access panels can be included on the first side 5, on the second side 6, on the top 7 (e.g., for access to oil filters, air filters, batteries, muffler 312, etc.), or any side that a particular design requires. As disclosed herein, the unique configuration of components provides ready access to the serviceable components by a same panel on a same side (e.g., first side 5).

Accordingly, as disclosed herein, the unique configuration of components provides multiple advantages over existing designs. Several non-limiting examples include, that the opposing compressor shaft provides service access points on a single side.

The relative configuration and distance between the compressor shaft and the engine clutch, linked by a tortuous belting path, is more reliable for a fixed compressor assembly and an isolated engine-generator assembly. This advantage is due to the longer belt spans from the clutch and the pulleys, and that a single belt is needed to drive the compressor as the generator is directly coupled to the engine. Also beneficially, the compressor is not mounted to the generator or engine, which helps mitigate vibration issues with the compressor during operation.

The opposing compressor with heart-shaped belting is the most compact way to package a rotary screw compressor in an engine-driven generator. This is because a minimal shaft centerline distance between the compressor shaft and the generator clutch.

The opposing compressor with heart-shaped belting is a more cost effective and simpler design. The compressor is configured to be rigidly mounted to the unit frame. The compressor does not have to be mounted to the vibrating generator or engine. Only one belt is needed for the compressor since the generator is directly coupled.

The opposing compressor pulleys are easily aligned with the clutch because the compressor and pulley assembly slides axially in the compressor mounting bracket.

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, systems, blocks, and/or other components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A power system comprising:
   a generator configured to be driven by an engine, the generator coupled to the engine on a first side of the generator and having a generator clutch extending from a second side of the generator opposite the engine, the generator clutch being coupled to the engine; and
   a compressor positioned at the second side of the generator opposite from the engine, the compressor comprising a compressor shaft extending toward the generator and configured to be driven via the generator clutch, such that the engine and the generator are configured to rotate in a first direction, and the compressor shaft is configured to rotate in a second direction opposite the first direction simultaneously while being driven via the generator clutch, wherein a distance between the generator clutch and the compressor shaft is less than a distance between the generator clutch and an idler pulley or a tensioner.

2. The power system as defined in claim 1, further comprising a belt configured to operatively link the generator clutch and a compressor pulley coupled to the compressor shaft.

3. The power system as defined in claim 2, wherein the compressor pulley is arranged between one or both of the idler pulley and the tensioner and the generator clutch.

4. The power system as defined in claim 3, wherein the generator clutch is configured to drive the belt, such that the idler pulley and the tensioner are driven in the first rotational direction.

5. The power system as defined in claim 3, wherein the belt is driven in a tortuous path around the generator clutch, the compressor pulley, the idler pulley and the tensioner, and wherein the belt is a two-sided drive belt.

6. The power system as defined in claim 3, wherein a first span of the belt linking the generator clutch to at least one of the idler pulley or the tensioner has a length that is greater than a possible second span that would directly link the generator clutch and the compressor pulley.

7. The power system as defined in claim 2, further comprising an enclosure having one or more service panels, wherein the enclosure is configured to provide service access to the generator, the engine, the belt and the compressor housed in the enclosure via the one or more service panels.

8. The power system as defined in claim 7, wherein the service access is provided by the one or more service panels that are located on a same side of the enclosure.

9. The power system as defined in claim 7, wherein the service access is located on at least one of a top side and a lateral side of the enclosure.

10. The power system as defined in claim 7, further comprising power conversion circuitry, the power conversion circuitry located in a compartment below the compressor within the enclosure.

11. The power system as defined in claim 1, wherein a crankshaft of the engine is directly coupled to an armature shaft of the generator to turn the generator clutch.

12. The power system as defined in claim 1, wherein the engine is a horizontal shaft air-cooled gasoline engine.

13. The power system as defined in claim 2, wherein the belt configured to operatively link the generator clutch and the compressor pulley coupled to the compressor shaft is disposed in a plane situated between the generator and the compressor.

14. A power system to provide welding-type power comprising:
an enclosure comprising;
 a generator configured to be driven by an engine and contained in the enclosure, the generator coupled to the engine on a first side of the generator and having a clutch extending from a second side of the generator opposite the engine, the clutch being coupled to the engine; and
 a compressor positioned at the second side of the generator opposite from the engine, the compressor having a compressor shaft extending toward the generator and configured to be driven via the clutch, such that the engine and the generator are configured to rotate in a first direction, and the compressor shaft is configured to rotate in a second direction opposite the first direction simultaneously while being driven via the clutch, wherein the compressor shaft is arranged between one or both of an idler pulley or a tensioner and the clutch; and
power conversion circuitry operatively connected to the generator.

15. The power system as defined in claim 14, wherein the enclosure is configured to provide service access to the generator, the engine, a belt, and the compressor on a same side of the enclosure.

16. The power system as defined in claim 14, wherein a crankshaft of the engine is directly coupled to an armature shaft of the generator to drive the clutch.

17. The power system as defined in claim 16, wherein the generator is configured to drive the compressor shaft by a belt linking the clutch and a compressor pulley coupled to the compressor shaft.

18. The power system as defined in claim 14, wherein the power conversion circuitry is configured to provide welding-type power for a welding-type tool.

19. The power system as defined in claim 18, wherein the welding-type tool is one of a welding-type torch, a plasma cutter, a wire feeder, and an induction heating device.

20. The power system as defined in claim 14, wherein the belt directly links the clutch to the idler pulley, the idler pulley to the compressor pulley, the compressor pulley to the tensioner, and the tensioner to the clutch, in that order, while the belt is driven by the clutch.

* * * * *